G. W. YOUNG.
SPOT LIGHT DIRECTING HANDLE.
APPLICATION FILED JUNE 28, 1919.

1,335,146.

Patented Mar. 30, 1920.

INVENTOR:
George W. Young
BY
Pierre James
ATTORNEY

UNITED STATES PATENT OFFICE.

GEORGE W. YOUNG, OF SEATTLE, WASHINGTON, ASSIGNOR TO DETROIT AUTO ACCESSORIES CO., OF SEATTLE, WASHINGTON, A CORPORATION OF WASHINGTON.

SPOT-LIGHT-DIRECTING HANDLE.

1,335,146.    Specification of Letters Patent.    Patented Mar. 30, 1920.

Application filed June 28, 1919. Serial No. 307,337.

*To all whom it may concern:*

Be it known that I, GEORGE W. YOUNG, a citizen of the United States, residing at Seattle, in the county of King and State of Washington, have invented certain new and useful Improvements in Spot-Light-Directing Handles, of which the following is a specification.

This invention relates to spot lights for motor vehicles. It is common to arrange a spot-light so that it can be regulated to direct its light beam in selected directions.

The object of the present invention is to overcome the above mentioned and other objections by means of an adjustable jointed handle having an end clamped to the lamp stem of a spot-light, and which is adapted to be rapidly adjusted to accommodate the operator.

In the accompanying drawings, which illustrate what I consider the best manner of carrying out my invention,—

Figure 1:
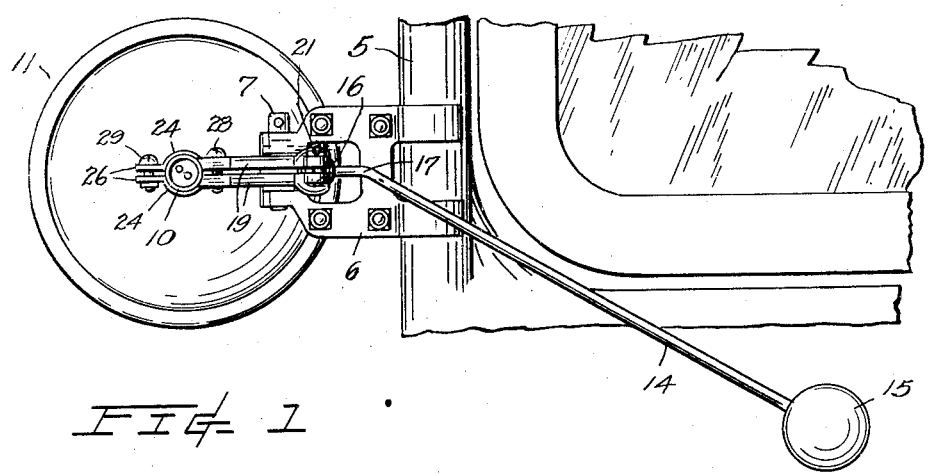
Figure 2:
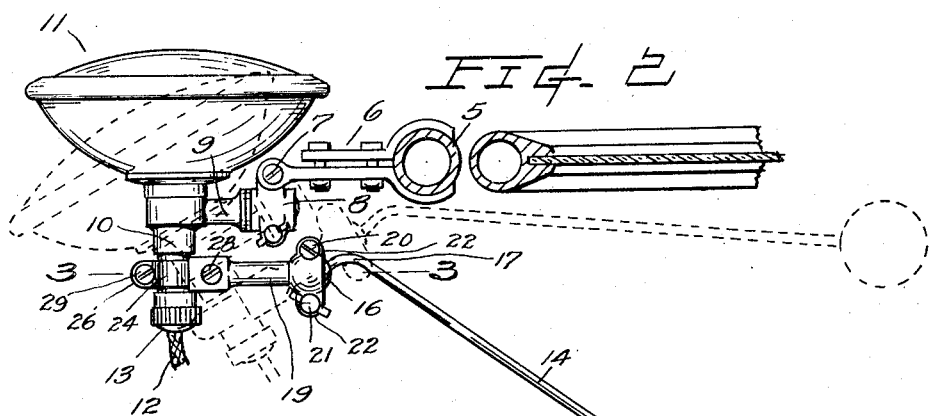
Figure 3:
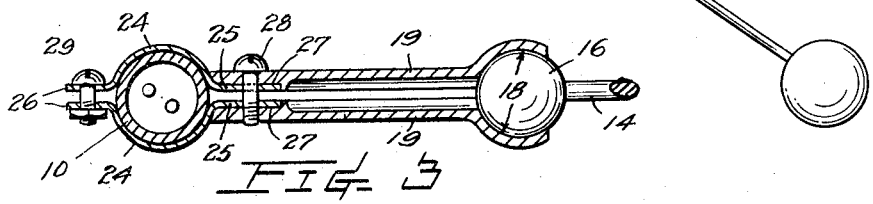
Figure 4:
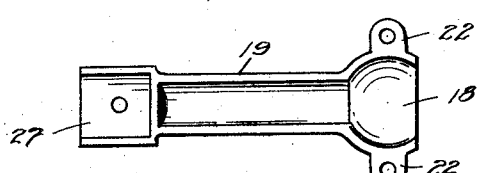

Figure 1 is a rear elevation of a part of the windshield of a motor vehicle and a spot-light to which the invention is applied. Fig. 2 is a plan view of the same with the windshield shown in horizontal section. Fig. 3 is a detail sectional view through 3—3 of Fig. 2. Fig. 4 is an inside plan view of one of the handle extension members.

The reference numeral 5 designates the post of an automobile windshield-frame to which is secured a laterally arranged bracket 6 having at its outer end an upright pin 7 which serves as a binding screw and a pivotal bearing for a horizontal sleeve 8. This sleeve serves as a bearing for an arm 9 extending at right angles from the stem 10 of a spot light lamp, indicated generally by 11. The stem 10 is tubular to accommodate the electrodes of the lamp circuit which are electrically connected with a source of current supply by means of wires provided within a cord 12 connected to a switch-cap 13, omitted in Fig. 1. All of the above named parts are, or may be, of any suitable or usual construction.

The structure and arrangement of the parts being such that horizontal revoluble movements are afforded to the lamp about the axis of the pin 7 and vertical revoluble movements are afforded about the axis of the arm 9.

According to the present invention, now to be described, I have devised a handle attachment to the lamp which enables the latter being most conveniently swung about each of the aforesaid axes.

14 represents a rod having, desirably, at one end a knob 15 and is rigidly secured at its other end to a spherical body or ball 16, said rod having adjacent to the latter a bend 17. The ball 16 is seated in correspondingly shaped sockets 18 provided at the ends of the parts 19 of an extension member. Said parts are coupled by means of screws 20 and 21 engaging in apertured ears 22 provided at diametrically opposite sides of the respective sockets. At least one of said screws, as 21, is provided with a winged head as shown, whereby the operator may regulate with his fingers the socket ends of said parts for the purpose of securing the ball therein in selected rotary positions. Said extension member is secured to the lamp stem 10 near the cap 13 by means of a clamp consisting of two similarly shaped halves 24 adapted to embrace the lamp stem 10, as shown, and are provided at opposite sides with ear elements 25 and 26. The ears 25 extend into recesses 27 provided in the respective parts of the extension member and are secured thereto by a screw 28 which also coöperates with a second screw 29 engaging in the clamp ears 26 to rigidly secure the extension member at right angles to the lamp stem.

Because of the bend 17 in the handle rod 14 and of the ball-and-socket connection between the rod and the extension 19—19 it is apparent that the handle can be adjusted to locate the knob end thereof to be in proximity to the steering wheel of the vehicle.

Positioning the handle to be within convenient reach of the driver is peculiarly important when traveling upon curved roads and when passing other vehicles provided with glaring headlights. When the spot-light is not needed, as during daylight, the handle rod 14 may be allowed to depend in a substantially vertical direction outside of the vehicle body or regulated into a position subjacent to the instrument board below the windshield.

The adjustment of the rod 14 with respect to the extension portion of the handle is accomplished by regulating the socket elements through the instrumentality of the screw 21. In Fig. 2 the spot light and associated parts are represented by full lines in their normal positions and by broken lines the same are illustrated, in the positions they would occupy, by way of example, when the light beam is to be directed to a point at the left.

The construction and operation of the invention will, it is thought, be understood from the foregoing description.

Various changes may be made to the illustrated embodiment of my invention without departing from the spirit thereof and within the scope of the appended claims.

What I claim, is—

1. In a spot light for motor vehicles, the combination with a swingable lamp having an axially disposed stem, of a handle comprising a rod member provided with a bend adjacent to one of its ends, an extension member, ball-and-socket connections between the extension member and the rod member in proximity to the bend thereof, means for adjustably securing the aforesaid members together at the joint thereof, and means for rigidly securing said extension member to the lamp stem at right angles to the axis of the latter.

2. In a spotlight for motor vehicles, the combination with a lamp arranged for vertical and horizontal swinging movements, said lamp behind provided with an axially disposed stem, of a handle comprising clamping elements, an extension member adapted to be secured at right angles to the lamp stem by means of said clamping elements, said member being provided with a socket, a rod element having at one end a ball which is positioned within said socket to enable the rod element being disposed in a selected angular position with respect to said extension member, and means for securing the rod in such an adjusted position.

3. In a spotlight for motor vehicles, the combination with the lamp arranged for horizontal and vertical swinging movements, of a lamp handle comprising a rod member having a ball element at one end, an extension member formed of two parts respectively provided with sockets to receive said ball and afford an adjustable joint between the rod and the extension members, screws engaging both parts of the extension member for clamping the ball in adjusted positions between the member parts, and means provided on said parts for detachably securing the handle to the lamp.

Signed at Seattle, Washington, this 20th day of June, 1919.

GEORGE W. YOUNG.

Witnesses:
PIERRE BARNES,
ELIZABETH JOHNSON.